V. J. F. BOUCHARDON.
GENERATOR OF HIGH FREQUENCY OSCILLATIONS FOR WIRELESS TELEGRAPHY.
APPLICATION FILED OCT. 24, 1919.

1,373,710.

Patented Apr. 5, 1921.

Inventor
V.J.F. Bouchardon,
By H.R. Kerslake
Attorney

UNITED STATES PATENT OFFICE.

VICTOR JOSEPH FRANÇOIS BOUCHARDON, OF LYON, FRANCE.

GENERATOR OF HIGH-FREQUENCY OSCILLATIONS FOR WIRELESS TELEGRAPHY.

1,373,710. Specification of Letters Patent. Patented Apr. 5, 1921.

Application filed October 24, 1919. Serial No. 333,116.

*To all whom it may concern:*

Be it known that I, VICTOR JOSEPH FRANÇOIS BOUCHARDON, a citizen of the French Republic, residing at No. 29 Rue Jeanne d'Arc, Lyon, France, have invented certain new and useful Improvements in and Relating to Generators of High-Frequency Oscillations for Wireless Telegraphy, of which the following is a specification.

This invention relates to generators of high frequency oscillations for wireless telegraphy.

Two types of generators of high frequency oscillations are used in wireless telegraphy:

(1) The generators of continuous oscillations; Poulsen arc, high frequency alternators, two-anode valves of the audion type. The valve generators are especially convenient for use in connection with small power stations. These generators have the advantage of giving a sharp syntony and allowing the reception by the heterodyne beat system with the high sensitivity which it affords. On the other hand, however, they have the drawback of necessitating a very exact syntony of the corresponding receiving apparatus.

(2) The generators of damped oscillations by means of electric sparks, which give a much less sharp syntony, a smaller range at equal power, but do not require such a precise regulation of the receiving apparatus in order to be received. For this reason these generators are generally preferred to the former for stations on board of ships or for coast stations which require to communicate rapidly with their corresponding stations.

The present invention has for its object to combine the advantage of both systems and it consists in using the same apparatus for producing electrical current for feeding two systems for generating oscillations, one by means of sparks and the other by means of valves, which systems may be alternately used, while keeping to the same wave length.

The spark generator, which is intentionally adjusted so that its syntony shall be moderately sharp, serves to call the corresponding station which tunes its receiving apparatus to the received wave length. Thereupon, simply by operating a certain number of switches, the valve station is started, the corresponding station now having only finely to adjust the receiving apparatus.

The current generator is composed of a polyphase alternator, the voltage of which is increased by a step-up transformer.

One mode of carrying the invention into effect by means of a three-phase current is illustrated, by way of example, in the accompanying drawings in which.

The feeding of a spark station by a similar generator has been described in detail by the applicant in American patent specification No. 1302129 of 29 April 1919.

Figure 1:
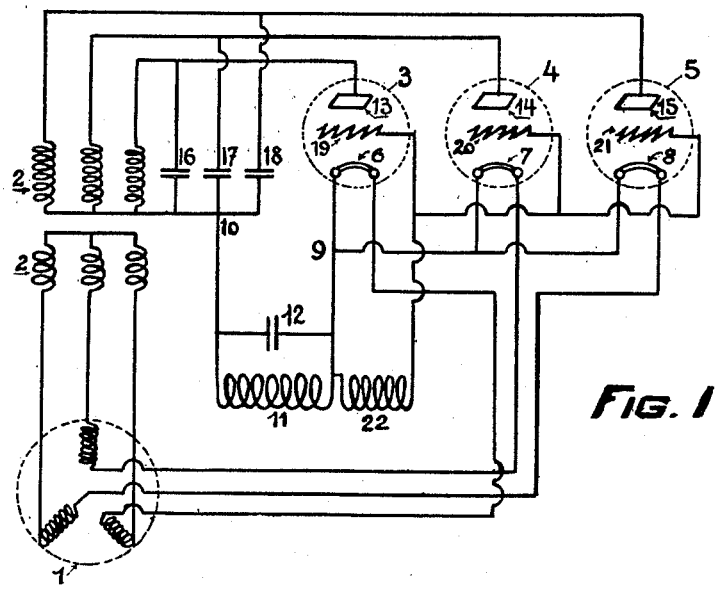
Figure 1 illustrates diagrammatically the feeding of a valve station by a three-phase current generator.

The feeding of the valve station by the three-phase current generator, is effected as shown in the diagram of Fig. 1. 1 is a three-phase alternator connected to a step-up transformer 2. The feeding of the station is effected by means of three valves 3, 4, 5. The filaments 6, 7, 8 are heated by the current of the alternator, either directly as shown in the diagram, or through the intermediary of a step-down transformer. They are star-connected: the neutral point 9 is connected to the neutral point 10 of the step-up transformer through the intermediary of a coil 11 shunted by a condenser 12 (which may be the capacity of an aerial).

Each of the plates 13, 14, 15 is connected to one of the phases of the transformer, and three condensers 16, 17, 18 shunt each of these phases which have a high impedance in order to allow the oscillating part of the plate current to pass. The three grids 19, 20, 21 are connected in parallel to the neutral point 9 through the intermediary of a grid coil 22 inductively coupled to the coil 11.

When a plate is positive relatively to the neutral point 10, an electronic current is established in the valve and follows the circuit 9, 10, 11. If a suitable coupling is used between the coils 11 and 22, continuous oscillations are produced in the oscillating circuit 11—12 as in the well known arrangement indicated by Meissner, de Forest, etc.

In the case of the feeding of valve stations of certain power, the polyphase alternating current may be produced by any known simple and strong apparatus. In contradistinction thereto, the continuous current would require high-tension dynamos of delicate and costly construction.

Figure 2:
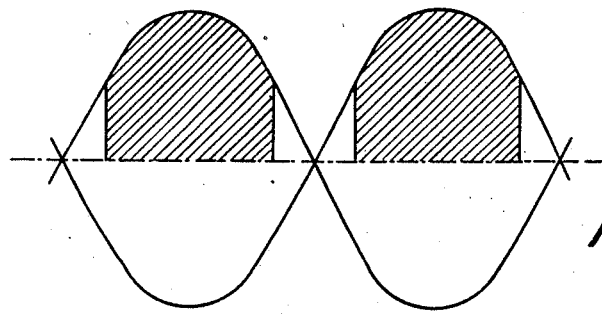
Figs. 2 and 3 are comparative diagrams showing the advantage which the three-phase current has over the one-phase current for this feeding by using in the monophase circuit two lamps, each plate being connected to one of the ends of the secondary of the transformer, the middle part of which is connected to the filament.
Figure 3:
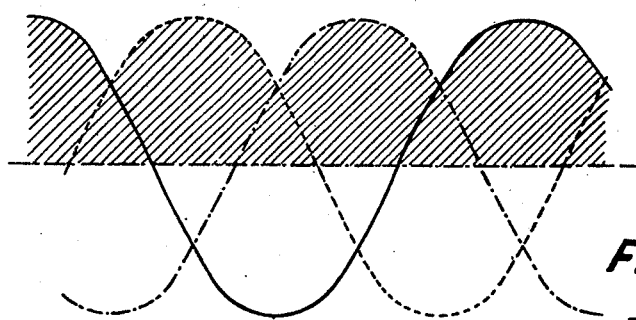

Moreover, the use of the three-phase current has the following advantage over the simple alternating current (single-phase) even by using two lamps in the monophase circuit, each plate being connected to one end of the secondary of the transformer, the middle part of which would be connected to the filament: Fig. 2 shows that with the single-phase current, the oscillations cease as soon as the voltage is no longer high enough for maintaining them, the hatched part showing the part of the period during which the oscillations are produced. Consequently the oscillations are not continuous, but are interrupted at each alternation during a certain time. In contradistinction thereto, Fig. 3 shows that with a three-phase current, the oscillations are continuous. The arrangement in parallel of the three grids compels them to oscillate synchronically, the valve, the plate potential of which is the strongest, thus helping to maintain the oscillations in the valve, the plate potential of which is not yet sufficient. The transition from one valve to the other is thus perfectly insured.

Figure 4:
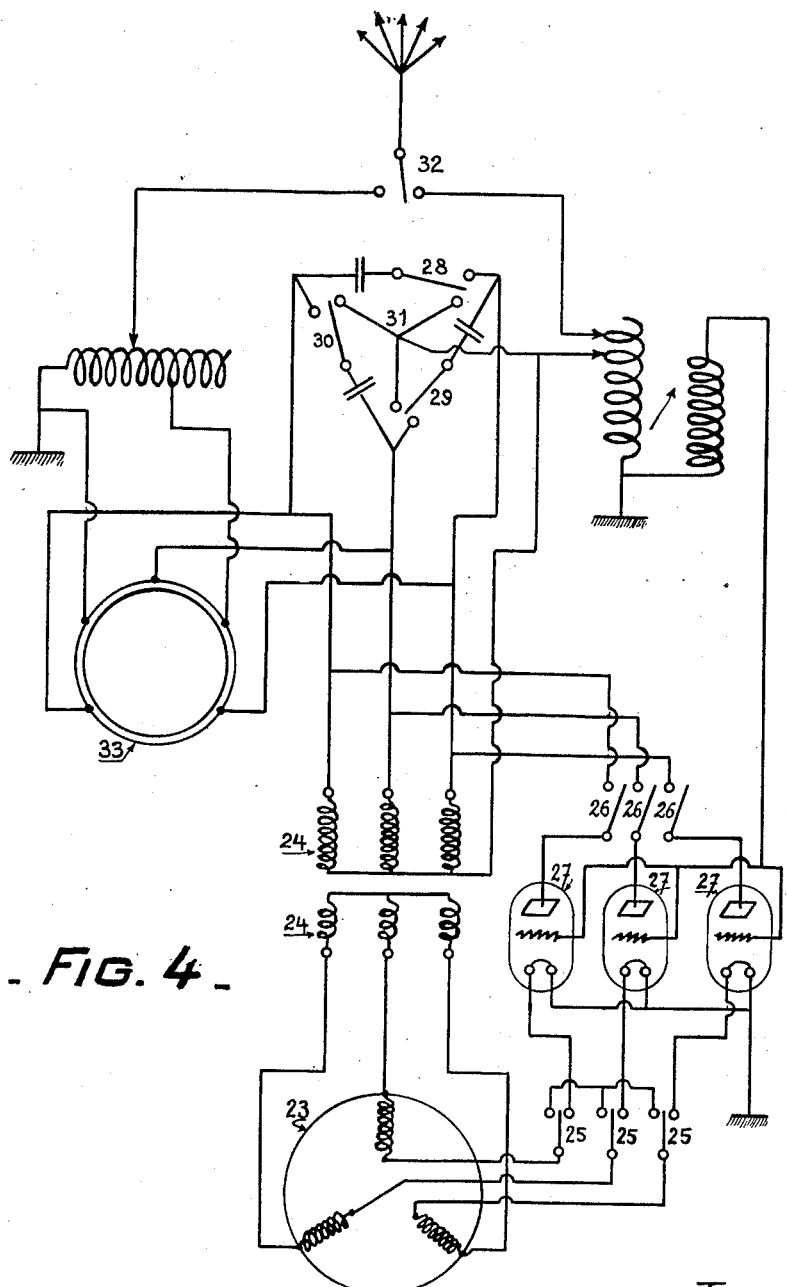
Fig. 4 illustrates an arrangement permitting the use of the three-phase current generator for feeding either a spark station, or a valve station.

Fig. 4 shows, by way of example, an arrangement permitting the use of the same alternator 23 and of the same transformer 24 for feeding either a spark station or a valve station by operating a certain number of switches.

The three-pole switch 25 allows the short-circuiting of the alternator either on a neutral point or on the valve filaments. The three-pole switch 26 connects the valve plates 27 to the secondary windings of the transformer 24. The three switches 28, 29, 30 allow of effecting either the delta-connection spark working of the condensers, or their star-connection on a neutral point 31 (working with valves). The current reversing-switch 32 connects the aerial either to the spark station, the rotary spark apparatus of which is diagrammatically shown at 33, or to the valve station.

What I claim is:—

1. A device for generating high frequency electrical oscillations comprising a generator of polyphase currents, a step-up transformer, double anode tubes with cathodic rays of the audion type, a rotary spark apparatus, identical condensers their number being equal to that of the phases of said generator and connected on one hand each with one of the secondaries of the transformer and on the other hand with the tubes and the rotary spark apparatus, switches for connecting to the generator either the tubes with cathodic rays, or said rotary spark apparatus, and switches for connecting said condensers either in delta connection, spark working, or in star connection, working with tubes, the switching of the generator from the rotary spark to the tubes apparatus and inversely being effected while keeping to the same wave length.

2. A device for maintaining high frequency electrical oscillations comprising a generator of polyphase currents, a step-up transformer, double-anode tubes with cathodic rays of the audion type comprising filament plate and grid fed by the generator, their number being equal to that of the phases of said generator, a coil connecting the neutral point of the tube filaments, which are star grouped, to the neutral point of the step-up transformer, a condenser shunting the said coil, condensers shunting each of the secondaries of the transformer, to which the tube plates are connected, and a coil inductively coupled to the above mentioned coil and connecting the grids of the tubes to the neutral point of the filaments.

3. A device for maintaining high frequency electrical oscillations comprising a generator of polyphase currents, a step-up transformer, double-anode tubes with cathodic rays of the audion type comprising filament, plate, and grid their number being equal to that of the phases of said generator, a coil connecting the neutral point of the tube filaments, which are star grouped to the neutral point of the step-up transformer, a condenser shunting said coil, a coil inductively coupled to the said coil and connecting the tube grids to the neutral point of the filaments, a rotary spark apparatus, identical condensers, their number being equal to that of the phases of said generator and connected on one hand each with one of the secondaries of the transformer and on the other hand with the tubes and the rotary spark apparatus, switches for connecting to the generator either the tubes with cathodic rays or said rotary spark apparatus, and switches for connecting said condensers either in delta connection, spark working, or in star connection, working with tubes, the switching of the generator from the rotary spark to the tube apparatus being effected while keeping to the same wave length.

In testimony whereof I have signed my name to this specification.

VICTOR JOSEPH FRANÇOIS BOUCHARDON.

Witnesses:
MARIN VACHON,
LOUIS ERCHEE.